(12) United States Patent
Tuan

(10) Patent No.: US 7,810,058 B1
(45) Date of Patent: Oct. 5, 2010

(54) EARLY POWER ESTIMATOR FOR INTEGRATED CIRCUITS

(75) Inventor: Tim Tuan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 367 days.

(21) Appl. No.: 11/054,896

(22) Filed: Feb. 10, 2005

(51) Int. Cl.
 *G06F 17/50* (2006.01)
(52) U.S. Cl. ............................................. 716/4; 716/5
(58) Field of Classification Search .................... 716/2, 716/4–6, 8–14, 1; 703/13, 18
See application file for complete search history.

(56) References Cited

U.S. PATENT DOCUMENTS

| | | | |
|---|---|---|---|
| 5,535,370 A * | 7/1996 | Raman et al. .................. | 703/15 |
| 6,212,665 B1 * | 4/2001 | Zarkesh et al. .................. | 716/4 |
| 6,272,668 B1 * | 8/2001 | Teene ........................... | 716/10 |
| 6,606,532 B1 * | 8/2003 | Yasuura et al. .............. | 700/117 |
| 6,950,998 B1 * | 9/2005 | Tuan .............................. | 716/2 |
| 6,993,737 B1 | 1/2006 | Anderson et al. | |
| 7,000,204 B2 * | 2/2006 | McGuffin et al. .............. | 716/5 |
| 7,076,405 B1 * | 7/2006 | Uchino ........................... | 703/2 |
| 2006/0009959 A1 * | 1/2006 | Fischer et al. .................. | 703/18 |
| 2007/0164785 A1 * | 7/2007 | He ............................... | 326/41 |

OTHER PUBLICATIONS

Anderson et al., "Switching Activity Analysis and Pre-layout Activity Prediction for FPGAs", ACM/IEEE, Apr. 5-6, 2003, pp. 1-36.*
Anderson et al., "Power estimation techniques for FPGAs," IEEE, 2003, pp. 1-2.*
Li et al., "Low-Power FPGA Using Pre-defined Dual-Vdd/Dual-Vt Fabrics," ACM, Feb. 22-24, 2004, pp. 17-26.*
Shang et al., "Dynamic Power Consumption In Virtex.TM_II FPGA Family," ACM, Feb. 24-26, 2002, pp. 157-164.*
Degalahal, Vijay et al.; "Methodology for High Level Estimation of FPGA Power Consumption," pp. 657-660, available from Xilinx, Inc. 2100 Logic Drive, San Jose, CA 95124, 2005.
Anderson, Jason H., et al., "Switching Activity Analysis and Pre-Layout Activity Prediction for FPGAs", ACM/IEEE International Workshop on Systems-Level Interconnect Prediction (SLIP 03), Monterey, California, Apr. 5-6, 2003, pp. 15-21.

* cited by examiner

*Primary Examiner*—Vuthe Siek
(74) *Attorney, Agent, or Firm*—William L. Paradice, III; Kin-Wah Tong; John J. King

(57) ABSTRACT

A method estimates the effective switched capacitance for any number of resource types that may be used to form a yet-to-be fabricated IC device using pre-layout netlists of the various resource types. The effective switched capacitances of the resource types are then combined with the operating frequency and the resource utilization of a user design to estimate the power consumption of the user design to be implemented in the device before physical samples of the device are available.

24 Claims, 4 Drawing Sheets

EARLY POWER ESTIMATOR FOR INTEGRATED CIRCUITS

FIELD OF INVENTION

This invention relates generally to power estimation techniques in integrated circuit (IC) devices, and in particular to estimating the power consumption of a user design to be implemented in an IC device prior to fabrication of the IC device.

DESCRIPTION OF RELATED ART

A programmable logic device (PLD) is a general-purpose device that can be programmed by a user to implement a variety of selected functions. One type of PLD is the Field Programmable Gate Array (FPGA), which typically includes an array of configurable logic blocks (CLBs) and a plurality of input/output blocks (IOBs). The CLBs are individually programmable and can be configured to perform a variety of logic functions on a few input signals. The IOBs can be configured to drive output signals from the CLBs to external pins of the FPGA and/or to receive input signals from the external FPGA pins. The FPGA also includes a programmable interconnect structure that can be programmed to selectively route signals among the various CLBs and IOBs to produce more complex functions of many input signals. The CLBs, IOBs, and the programmable interconnect structure are programmed by loading configuration data into associated memory cells that control various switches and multiplexers within the CLBs, IOBs, and the interconnect structure to implement logic and routing functions specified by the configuration data to implement a user design in the FPGA. An FPGA may also include other programmable and non-programmable resources.

One important advantage of FPGA devices is their relatively fast time-to-market, for example, as compared to Application Specific Integrated Circuit (ASIC) devices. To further reduce time-to-market, FPGA manufacturers typically provide delay models, speed models, and timing models of an FPGA architecture to their customers before physical samples of the device are available, thereby allowing customers to begin developing and simulating their designs prior to fabrication of the FPGA device. However, although power consumption is becoming an increasingly important design consideration for FPGA devices, FPGA manufacturers have not yet been able to provide an effective tool for estimating the power consumption of a user design to be implemented in an FPGA device before the FPGA device is actually fabricated in silicon.

Indeed, current techniques for estimating the power consumption of a user design to be implemented in an FPGA device require a physical sample of the FPGA device so that its various resources may be characterized to determined their switched capacitances, which may then be combined with the operating voltage, average input signal switching frequency, resource utilization, and other characteristics of the user design to estimate the power consumption of the user design. As a result, prior power estimation techniques are not performed until after the FPGA device is actually fabricated and available for characterization.

Accordingly, it would be desirable to estimate the power consumption of a user design that is to be implemented in yet-to-be fabricated FPGA device so that customers are able to modify their designs for power consumption issues prior to the fabrication of the FPGA device.

SUMMARY

A method is disclosed for estimating the power consumption of a user design that is to be implemented in a PLD prior to the actual fabrication of the PLD. The power consumption (P) of a user design implemented in a PLD may be expressed as $P=\Sigma V^2 * C_i * U_i * f_i$, where V is the operating voltage, $C_i$ is the capacitance of the $i^{th}$ resource, $U_i$ is the number of the $i^{th}$ resource utilized by the user design, and $f_i$ is the switching frequency of input signals provided to the $i^{th}$ resource. In accordance with the present invention, the effective switched capacitance of a resource may be estimated. For some embodiments, the pre-layout netlist of the resource is provided. The resource, as defined by its pre-layout netlist, is then simulated to determine its power consumption for a selected switching frequency. For embodiments in which more than one resource configuration is simulated, the resulting simulated power consumptions may be averaged. Next, the estimated switched capacitance of the resource for the selected switching frequency is derived from the simulated power consumption. Because the PLD has not yet been fabricated in silicon, the pre-layout netlists of its resources do not include parasitic wire capacitances of the resource, and therefore are estimated using various embodiments of the present invention. Then, the estimated switched capacitance of the resource is combined with the estimated parasitic wire capacitances of the resource to generate the effective switched capacitance of the resource.

For other embodiments, the effective switched capacitance of the resource may be estimated by first characterizing each type of circuit block that will be used to form the resource to calculate the estimated switched capacitance of each circuit block, and then combining the resulting estimated switched capacitances of the circuit blocks with information indicating how many of each circuit block will be used to form the resource.

The parasitic wire capacitance of the resource includes the parasitic wire capacitance of signal lines external to the resource as well as the parasitic wire capacitance of signal lines internal to the resource. For some embodiments, the external parasitic wire capacitance may be estimated using well-known resistive-capacitive (RC) wire models, and the internal parasitic wire capacitance may be estimated by multiplying the estimated switched capacitance of the resource by a predetermined percentage. For other embodiments, the internal parasitic wire capacitance may be estimated using RC wire modeling techniques.

For some embodiments, the resource may be simulated using a well-known simulation engine to simulate the power consumption of the resource at a selected switching frequency. For example, after the switching frequency is selected, a set of input vectors that transition logic states at the selected switching frequency is generated. The set of input vectors, the pre-layout netlist of the resource, and various simulation operating parameters are provided as input parameters to the simulation engine, which in response thereto simulates the power consumption of the resource at the selected switching frequency. Then, as mentioned above, the estimated switched capacitance of the resource may be derived from the simulated power consumption.

By providing a tool for estimating the power consumption of a user design to be implemented in a yet-to-be fabricated PLD, embodiments of the present invention allow users to simulate, and if necessary, to modify their designs for power consumption much earlier than prior power estimation techniques allow, thereby further reducing the time-to-market for such user designs, which in turn may provide a significant commercial advantage.

BRIEF DESCRIPTION OF THE DRAWINGS

The features and advantages of the present invention are illustrated by way of example and are by no means intended to limit the scope of the present invention to the particular embodiments shown, and in which.

Like reference numerals refer to corresponding parts throughout the drawing figures.

DETAILED DESCRIPTION

Embodiments of the present invention are described below in the context of an exemplary FPGA device for simplicity only. It is to be understood that present embodiments are equally applicable to other programmable logic devices (PLDs) such as complex PLDs, as well as to other IC devices such as application-specific integrated circuit (ASIC) devices, microprocessors, and the like. In the following description, for purposes of explanation, specific nomenclature is set forth to provide a thorough understanding of the present invention. In other instances, well-known circuits and devices are shown in block diagram form to avoid obscuring the present invention unnecessarily. Accordingly, the present invention is not to be construed as limited to specific examples described herein but rather includes within its scope all embodiments defined by the appended claims.

Figure 1:
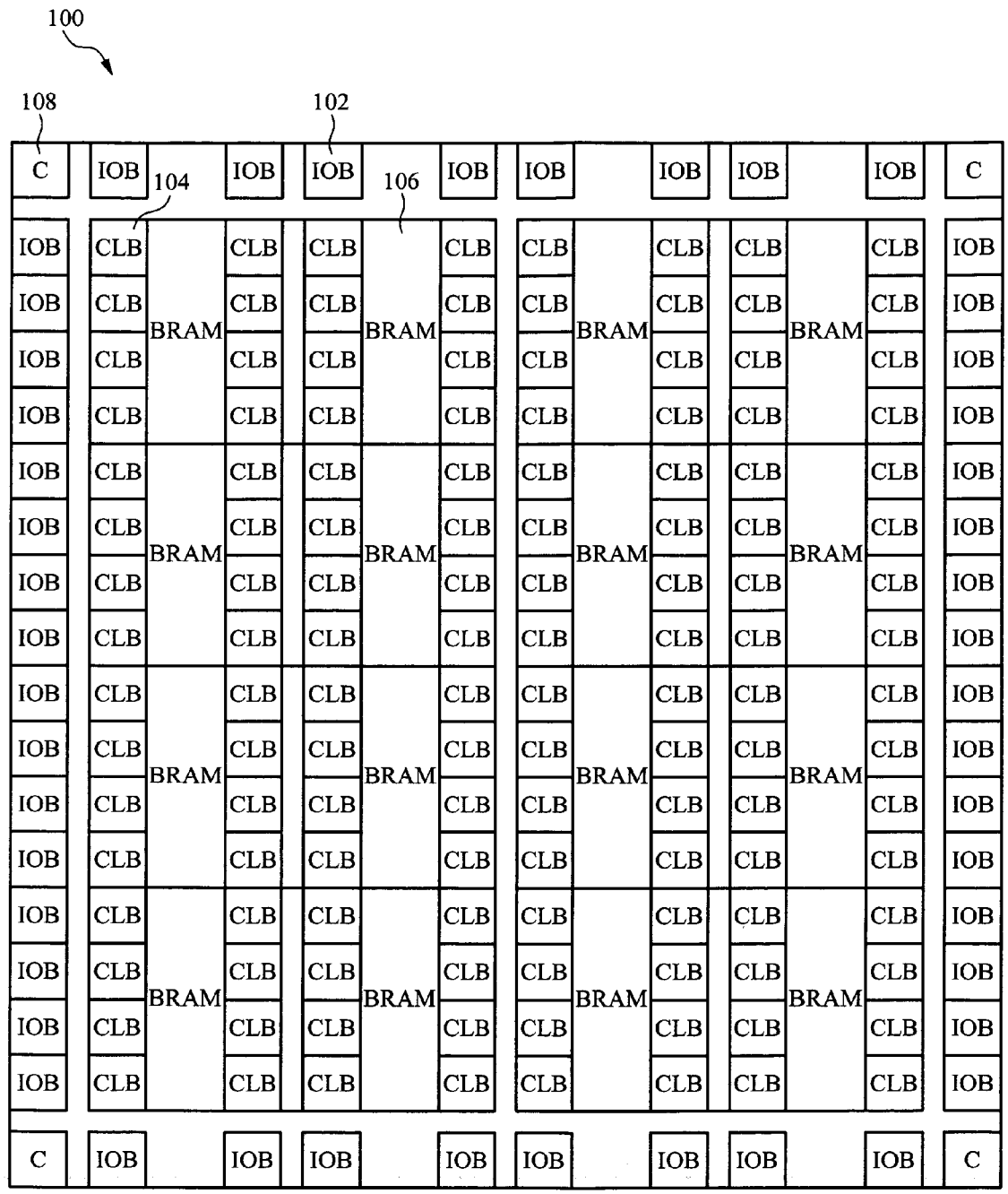
FIG. 1 is a block diagram showing the various resources of an exemplary FPGA architecture to which embodiments of the present invention may be applied.

FIG. 1 illustrates the general layout of IOBs, CLBs, and block RAMs (BRAMs) of a field programmable gate array (FPGA) 100 within which some embodiments of the present invention may be implemented. IOBs 102 are well-known, and are located around the perimeter of FPGA 100. CLBs 104 are well-known, and are arranged in columns in FPGA 100. Block RAMs 106 are well-known, and are arranged in columns between adjacent CLB columns. A well-known general interconnect circuitry (not shown for simplicity) is provided to programmably connect the IOBs 102, CLBs 104, and block RAMs 106. Corner blocks 108 are well-known, and may contain configuration circuitry and/or may be used to provide additional routing resources. Although a particular FPGA layout is illustrated in FIG. 1, it is to be understood that many other FPGA layouts are possible, and are considered to fall within the scope of the present invention. For example, other embodiments may have other numbers of IOBs 102, CLBs 104, and block RAMs 106, and may have other types of blocks, such as multipliers and/or processors. As another example, some embodiments may have different arrangements, such as an architecture where the blocks are organized in columns.

Each of the resource types (e.g., IOBs 102 and CLBs 104) of FPGA architecture 100 may be formed using various combinations of different types of basic circuit blocks. For example, each CLB resource may include one or more slices, each of which is typically formed using a plurality of multiplexers (MUXes), flip-flops, and look-up tables (LUTs). Similarly, each IOB tile is typically formed using a plurality of MUXes and flip-flops. Further, the programmable interconnect structure is typically formed using numerous signal lines of varying lengths (e.g., single-length lines, double-length lines, long lines, hex lines, and global lines) that may be selectively interconnected using a plurality of programmable interconnect points, which are frequently implemented using pass gate transistors controlled by a configuration bit.

Figure 2:
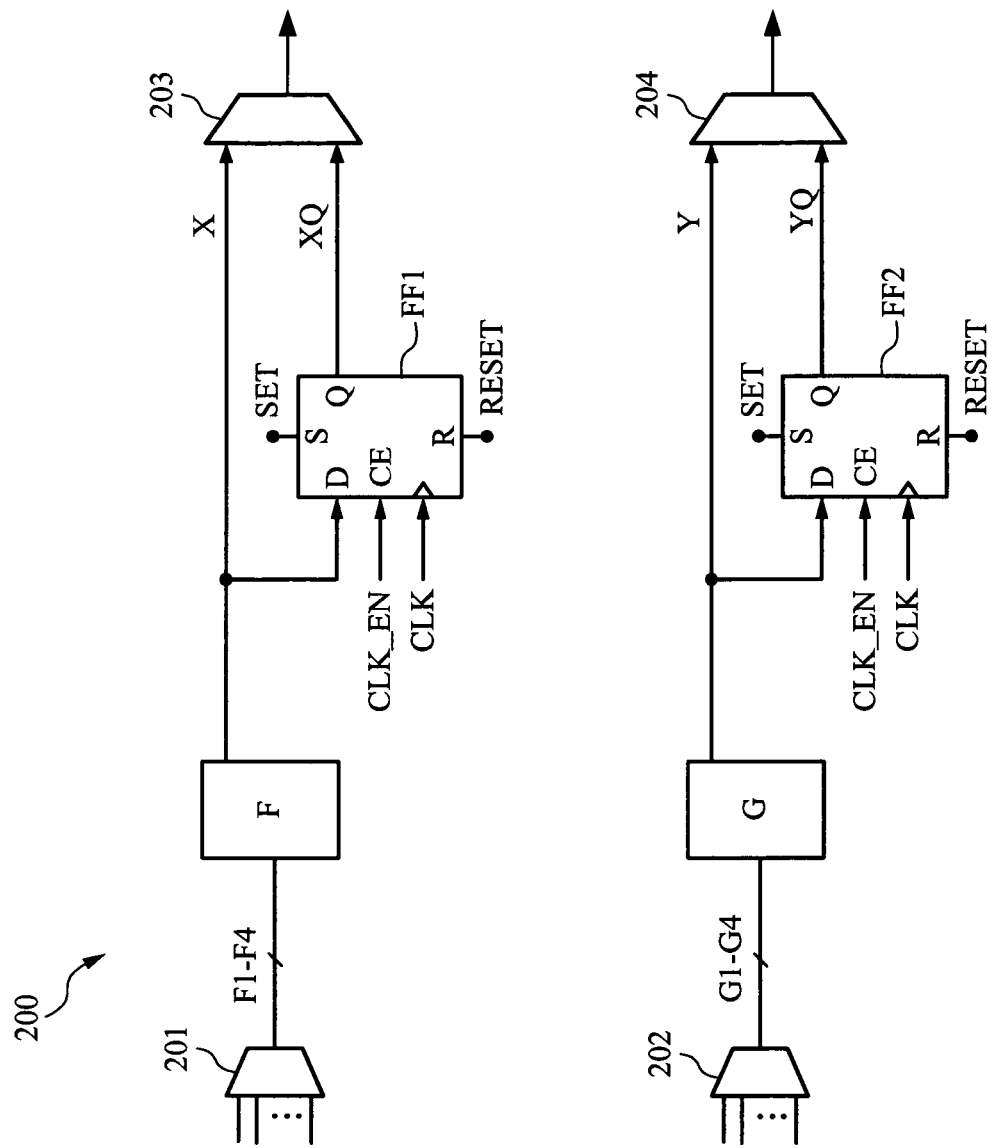
FIG. 2 is a simplified block diagram illustrating the various types of circuit blocks that may be used to form an exemplary CLB resource of the FPGA architecture of FIG. 1.

For example, FIG. 2 is a simplified functional diagram of a CLB slice 200 for the exemplary FPGA architecture of FIG. 1. Slice 200 is shown to include two function generators F and G, two flip-flops FF1 and FF2, two input MUXes 201-202, and two output MUXes 203-204. Function generators F and G are typically implemented as well-known 4-input LUTs that may be configured to implement any Boolean logic function of their input signals to generate respective output signals X and Y. For other embodiments, each function generator F and G may be configured as a 16-bit shift register or as a 16×1 RAM. The four inputs F1-F4 of function generator F receive input signals from various input signal lines via input MUX 201, and the four inputs G1-G4 of function generator G receive input signals from various input signal lines via input MUX 202.

Flip-flop FF1 has a data input D to receive an output signal X from function generator F, and provides a registered output signal XQ. Similarly, flip-flop FF2 has a data input D to receive an output signal Y from function generator G, and provides a registered output signal YQ. The output signals X/XQ and Y/YQ are selectively output (e.g., to various external signal lines in the programmable interconnect structure) via output MUXes 203 and 204, respectively. In addition, flip-flops FF1 and FF2 each have a clock input (>) to receive a clock signal CLK, a clock enable input CE to receive a clock enable signal CLK_EN, and S/R inputs to receive set and reset signals, respectively.

As mentioned above, an FPGA device may implement a variety of user designs by appropriately configuring the FPGA's resources using configuration data contained in a configuration bitstream. Typically, a physical design to be implemented in the FPGA device is first embodied as a netlist and stored in a well-known NCD file, although other netlist file formats may be used. Then, a well-known software tool such as "netgen" is used to create a transistor-level specification of the design from the NCD file. The transistor-level specification may be described in a suitable Hardware Descriptor Language (HDL), for example, using Verilog. The transistor-level specification is then synthesized to the basic circuit blocks (e.g., MUXes, flip-flops, LUTs, and the like) which form the resources that will be available on the FPGA device. A well-known place and route process then assigns every logic cell and signal wire in the user design to some physical resource in the FPGA. In some embodiments, higher level design languages and modeling techniques may also be used to represent the design to be implemented in the FPGA device.

As explained below, embodiments of the present invention may be used to estimate the power consumption of a user design that is to be implemented in a yet-to-be fabricated FPGA device, thereby allowing users to consider the power consumption of their designs and make any necessary design modifications before physical samples of the FPGA device are available. In this manner, embodiments of the present invention may further reduce the time-to-market for the users' designs, which in turn may provide a significant commercial advantage over prior power estimation techniques that require physical samples of the FPGA device.

For example, when an FPGA manufacturer desires to fabricate an existing FPGA architecture using a newer process technology (e.g., one having smaller device geometries), the ability to estimate the power consumption of a user's design prior to the actual fabrication of the FPGA device may provide a significant commercial advantage to the user because the design may be readied for implementation in the FPGA device as soon as the FPGA device is physically available.

Figure 3:
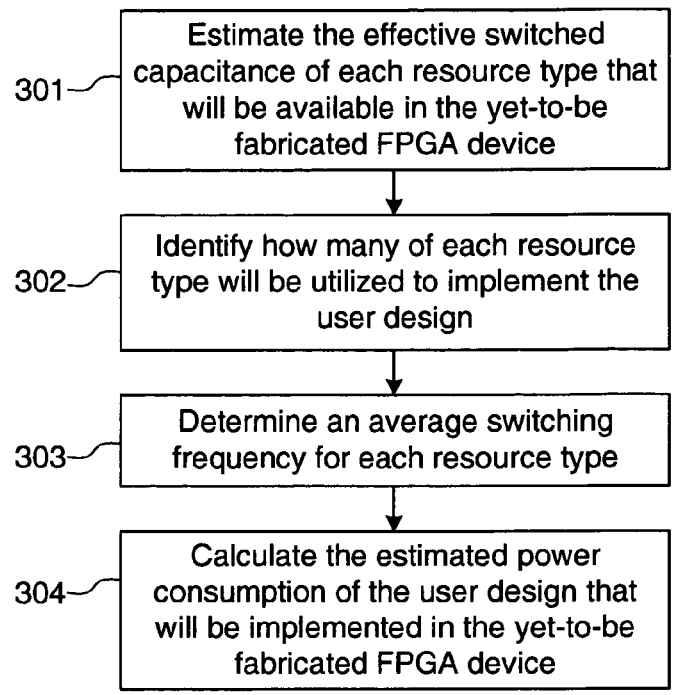
FIG. 3 is an illustrative flow chart depicting the general operation of an exemplary embodiment of the present invention for estimating the power consumption of a user design to be implemented in a yet-to-be fabricated FPGA device.

The general operation of an exemplary embodiment of the present invention for estimating the power consumption of a user design to be implemented in a yet-to-be fabricated FPGA device is described below with respect to the illustrative flow chart of FIG. 3. First, the effective switched capacitance of each type of resource that will be available in the yet-to-be fabricated FPGA device is estimated (step 301). For some embodiments, the effective switched capacitance may be determined only for the resources that will actually be used to implement the user design. Once the effective switched capacitances of the resources are estimated, the number of each resource type that will be utilized to implement the user design is identified (step 302). For example, because the dynamic power consumption of a user design to be implemented in an FPGA device depends upon the particular combination of the resources utilized by the user design, an accurate estimation of the power consumed by the user design involves determining how many of each resource type of the FPGA will be utilized to implement the user design. For some embodiments, the resource utilization of the user design may be extracted from the transistor-level description of the user design (e.g., from the Verilog file) in a well-known manner. For other embodiments, the resource utilization of the user design may be extracted from the physical design (e.g., from the NCD file) in a well-known manner.

Next, the average switching frequency of each resource that will be utilized to implement the user design is determined (step 303). For some embodiments, an HDL simulation model of the user design with back-annotated physical delay information may be created from the physical design (e.g., from the NCD file) using the "netgen" tool, which is provided in the well-known ISE package available from Xilinx, Inc. The HDL simulation model may then be used to simulate the design's timing model with realistic input vectors using a suitable simulation tool such, for example, the well-known Modelsim SE tool. The simulation tool generates a value change dump (VCD) file that contains the switching activity of all internal nets contained in the user design. The switching activity of each resource may then be extracted by parsing the physical design file and/or the HDL simulation model to identify the relevant nets, and look up their switching activity in the VCD file. Determining the average switching frequency of a selected FPGA resource is well-known, and therefore is not described in further detail herein.

For other embodiments, the switching activity of a resource may be estimated using suitable constants for the various types of circuit blocks that will be utilized to form the resource. For example, to estimate the switching activity of a LUT that may be used to implement a CLB slice, a constant switching frequency of approximately 12.5% of the clock frequency may be used. The constant value of 12.5% corresponds to the average switching activity for input signal logic state transitions of a 16-bit counter, which as mentioned above is often used to implement the function generators in CLB slices. Of course, for other embodiments, other constants representative of the average switching frequency of a corresponding resource type may be used.

Then, the power consumption of the user design that is to be implemented in the yet-to-be fabricated FPGA device is calculated using the estimated switched capacitance of each resource type, information indicating how many of each resource will be used to implement the user design, the average switching frequency of each resource, and the operating voltage to be used by the user design (step 304). For example, the estimated power consumption (P) of the user design may be expressed as $P = \Sigma V^2 * C_i * U_i * f_i$, where V is the operating voltage, $C_i$ is the effective switched capacitance of the ith resource, $U_i$ is the number of the ith resource that will be utilized to implement the user design, and $f_i$ is the average switching frequency of input signals to the ith resource.

Figure 4:
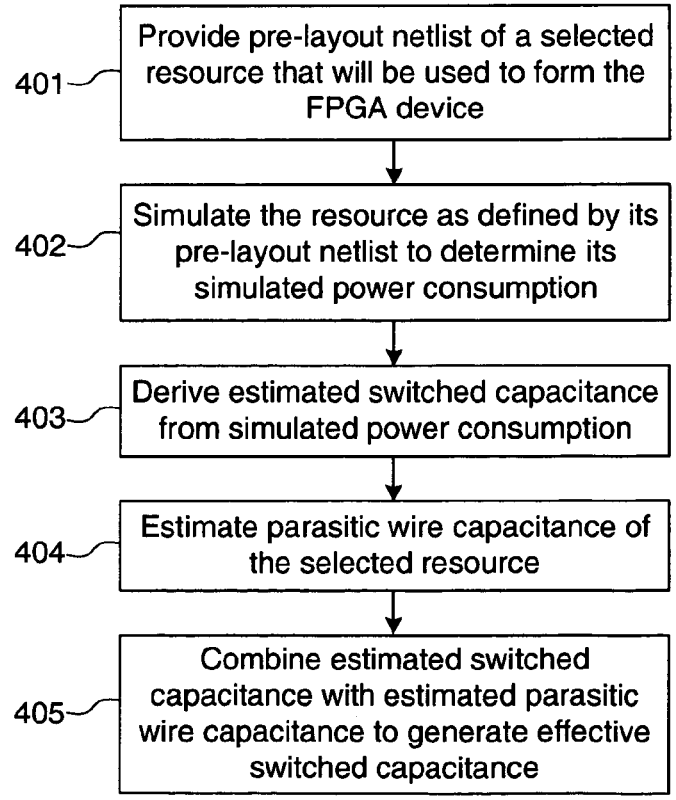
FIG. 4 is an illustrative flow chart depicting the operation of an exemplary embodiment for characterizing a selected resource of an FPGA device to estimate its effective switched capacitance.

The effective switched capacitance of a resource may be estimated by characterizing one or more selected configurations of the resource. For example, FIG. 4 illustrates an exemplary operation of some embodiments for characterizing a resource (e.g., such as a CLB resource of FIG. 2) to estimate its effective switched capacitance. First, the pre-layout netlist of the resource is provided (step 401). The pre-layout netlist is a transistor-level description of the resource that is generated prior to the physical fabrication of the FPGA device. The pre-layout netlist, which also describes many of the behavioral characteristics of the resource, may be obtained from the foundry that will be fabricating the FPGA device. For example, when an existing FPGA architecture is to be manufactured by a foundry using a new fabrication process, the foundry typically provides a cell library containing the pre-layout netlists that describe simulated behavioral characteristics of each type of resource that will be used to form the FPGA device.

The resource, as defined by its pre-layout netlist, is then simulated using a suitable simulation engine to determine its simulated power consumption for a selected switching frequency (step 402). For some embodiments, the resource may be simulated using a well-known software tool such as HSPICE or Nanosim that simulates the behavioral characteristics of the resource in response to various input signals and operating parameters. Next, the estimated switched capacitance $G_{est}$ of the resource for the selected switching frequency is derived from the simulated power consumption of the resource using the expression $C_{est} = P_{sim}/(V^2 * f)$, where $P_{sim}$ is the simulated power consumption, V is the operating voltage, and f is the selected switching frequency (step 403). For some embodiments, the simulation engine may utilize well-known macro-modeling techniques to generate $P_{sim}$, although other suitable power simulation techniques may be used.

As mentioned above, the resource is simulated using its pre-layout netlist, which does not include the parasitic wire capacitance associated with the resource because the resource has not yet been fabricated in silicon. Thus, in accordance with some embodiments of the present invention, the parasitic wire capacitance associated with the resource is estimated (step 404). Then, the estimated switched capacitance of the resource is combined with the estimated parasitic wire capacitance of the resource to generate the effective switched capacitance of the resource (step 405).

For other embodiments, the effective switched capacitance of the resource may be estimated by first characterizing each type of circuit block that will be used to form the resource to calculate the estimated switched capacitance of each circuit block, for example, by simulating pre-layout netlists of each circuit block type, and then combining the resulting estimated switched capacitances of the circuit blocks according to how many of each circuit block will be used to form the resource. For some embodiments, the particular combination of circuit blocks that will be used to form the resource may be obtained from the pre-layout netlist of the resource. For example, to determine the effective switched capacitance of a CLB slice, the switched capacitances of its MUX, LUT, and flip-flop elements are first estimated using the simulation engine and then combined according to how many of the MUX, LUT, and flip-flop elements will be utilized to form the CLB slice for the given resource configuration.

As mentioned above, because the pre-layout netlists do not include parasitic wire capacitances, for some embodiments the parasitic wire capacitances of the resources that will be used to form the yet-to-be fabricated FPGA device may be estimated. The parasitic wire capacitance of a resource includes both the parasitic capacitance of internal signal lines (e.g., signal lines within the resource) and the parasitic capacitance of external signal lines (e.g., signal lines in the device's programmable interconnect structure that will be connected to the resource).

Figure 5:
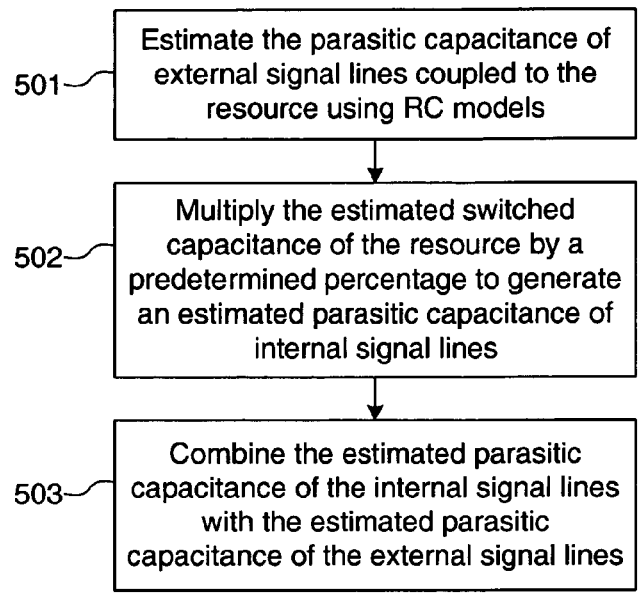
FIG. 5 is an illustrative flow chart depicting the operation of an exemplary embodiment for estimating the parasitic wire capacitance of the selected resource.

For example, FIG. 5 illustrates an exemplary operation of some embodiments for estimating the parasitic wire capacitance of a resource. The external parasitic wire capacitance of the resource may be estimated using well-known resistive-capacitive (RC) wire models that contain the length, width, and metal layer properties of a selected signal line in the programmable interconnect structure to be formed in the FPGA device (step 501). For some embodiments, the longest programmable interconnect signal lines (e.g., the global interconnect lines in the Virtex family of FPGA devices available from Xilinx, Inc.) are selected for RC wire modeling, although for other embodiments other interconnect signal lines may be used. The length, width, and metal layer properties of the selected interconnect signal line may be estimated using suitable process parameters and geometry information provided by the foundry selected to fabricate the new FPGA device.

For some embodiments, the parasitic wire capacitance of the resource's internal signal lines may be estimated by multiplying the effective switched capacitance of the resource by a predetermined percentage (step 502). For example, empirical data shows that for some embodiments of the Virtex family of FPGA devices available from Xilinx, Inc., the local wire parasitic capacitances are equal to approximately 35% of the effective switched capacitance of the resource. Because the predetermined percentage depends upon the semiconductor manufacturing process used by the foundry selected to fabricate the FPGA device, for some embodiments the predetermined percentage is provided by the foundry. For other embodiments, the parasitic wire capacitance of the resource's internal signal lines may be estimated using well-known RC wire models.

Then, the estimated parasitic capacitance of the external signal lines is combined with the estimated parasitic capacitance of the internal signal lines to generate the estimated parasitic wire capacitance for the resource (step 503).

Figure 6:
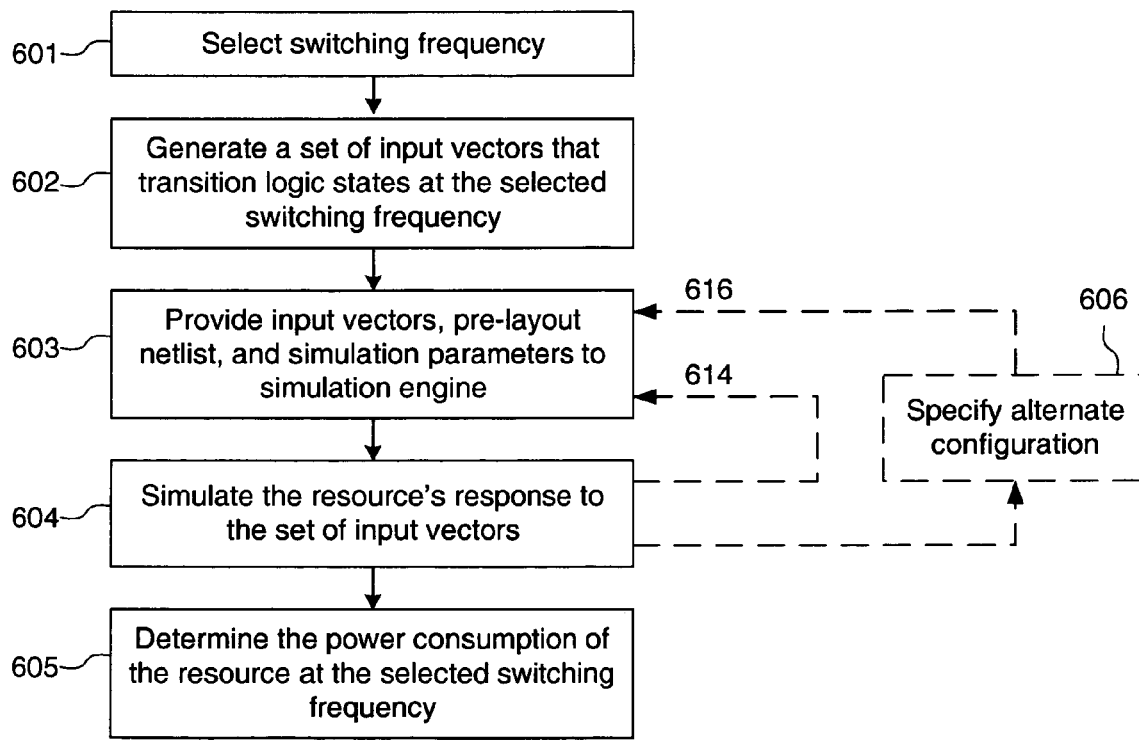
FIG. 6 is an illustrative flow chart depicting the operation of an exemplary embodiment for simulating the power consumption of the selected resource.

FIG. 6 illustrates an exemplary operation of some embodiments for determining the simulated power consumption of a resource for a selected switching frequency. First, a switching frequency (f) is selected for simulating the resource (step 601). Then, a set of input vectors (e.g., a sequence of input signals) that transition logic states at the selected switching frequency is generated (step 602). For some embodiments, the selected switching frequency is provided as an input to a software script that utilizes a pseudo-random number generator to generate a set of uncorrelated input vectors whose logic states collectively transition at the selected switching frequency.

The set of input vectors, the pre-layout netlist of the resource, and various simulation operating parameters (e.g., process parameters, the operating voltage, operating temperature, etc.) are provided as input parameters to the simulation engine (step 603). For some embodiments, the software script employed to generate the set of input vectors may be used to provide the input parameters to the simulation engine. For one embodiment, the software script may be configured to control operation of the simulation engine. For other embodiments, the input parameters may be provided to the simulation engine using other suitable techniques.

Then, using the input parameters, the simulation engine simulates the resource's response to the set of input vectors (step 604), and in response thereto determines the simulated power consumption of the resource at the selected switching frequency using well-known simulation techniques (step 605). For some embodiments, the simulation engine may utilize well-known macro-modeling techniques to simulate the power consumption of the resource, although other suitable power simulation techniques may be used.

In some embodiments, steps 603 and 604 may be optionally repeated (as indicated by dashed line 614). For example, additional sets of input vectors may be provided to the simulation engine and the resource's response to the additional sets of vectors may be simulated in order to increase the accuracy of the results. In some embodiments, an alternate configuration may optionally be specified for the resource (step 606) prior to providing additional sets of input vectors (as indicated by dashed line 616). This allows for simulation of multiple configurations of the circuit to cover a variety of possible operating configurations. Feedback paths 614 and 616 may be repeated as many times as is necessary to achieve the desired level of accuracy.

The simulation operation described above with respect to FIG. 6 may be performed for a plurality of different switching frequencies to generate a plurality of corresponding simulated power consumption values, each of which may be used to derive a corresponding effective switched capacitance, for example, as described above with respect to FIG. 3. The resulting plurality of effective switched capacitances may then be averaged to generate an estimated effective switched capacitance of the resource. For some embodiments, the average of the plurality of different switching frequencies is approximately equal to the average switching frequency determined in step 303 of FIG. 3.

Embodiments of the present invention may also be used to estimate the switched capacitance of the resources in an FPGA device that has already been fabricated. For example, netlists extracted from the actual physical layout of the FPGA's resources may be simulated to determine the simulated power consumption of the resource, from which the estimated switched capacitance may be derived in the manner described above. Because the netlists extracted from actual physical layouts already include the actual parasitic wire capacitances associated with the resource, estimating the power consumption of a user design to be implemented in an FPGA device that has already been fabricated may be more accurate than estimating the power consumption of a user design to be implemented in a yet-to-be fabricated FPGA device.

While particular embodiments of the present invention have been shown and described, it will be obvious to those skilled in the art that changes and modifications may be made without departing from this invention in its broader aspects, and therefore, the appended claims are to encompass within their scope all such changes and modifications as fall within the true spirit and scope of this invention.

What is claimed is:

1. A method of simulating an operation of an integrated circuit (IC) having one or more types of programmable resources, the method comprising:
    estimating, in accordance with a simulation engine, an effective switched capacitance for the one or more types of programmable resources of a yet-to-be fabricated IC, wherein said yet-to-be fabricated IC has not been fabricated, wherein the estimating the effective switched capacitance for a selected type of programmable resource comprises:
        characterizing the selected type of programmable resource as embodied by one or more corresponding pre-layout netlists, wherein the characterizing comprises:
            deriving a switched capacitance of the selected type of programmable resource from a simulated power consumption;
            estimating a parasitic wire capacitance of the selected type of programmable resource by estimating the parasitic capacitance of one or more external signal lines coupled to the selected type of programmable resource and multiplying the switched capacitance of the selected type of programmable resource by a predetermined percentage to generate an estimated parasitic capacitance of internal signal lines of the selected type of programmable resource; and
            combining the switched capacitance of the selected type of programmable resource with the parasitic wire capacitance of the selected type of programmable resource;
    identifying a number of each of the one or more types of programmable resources that will be utilized to implement a user design in the yet-to-be fabricated IC;
    determining an average switching frequency for each of the one or more types of programmable resources;
    calculating an estimated power consumption of the user design based on the estimated effective switched capacitance, the identified number of each of the one or more types of programmable resources, and the determined average switching frequency; and
    outputting the estimated power consumption for review by a user.

2. The method of claim 1, wherein the deriving comprises:
    providing the one or more corresponding pre-layout netlists to a simulation engine; and
    simulating a power consumption of the selected type of programmable resource using the simulation engine.

3. The method of claim 2, wherein estimating the parasitic wire capacitance comprises:
    estimating the parasitic capacitance of the one or more external signal lines coupled to the selected type of programmable resource using a resistive-capacitive (RC) model; and
    combining the parasitic capacitance of the external signal lines with the estimated parasitic capacitance of the internal signal lines.

4. The method of claim 2, wherein the simulating comprises:
    selecting a first switching frequency for the selected type of programmable resource;
    generating a first set of input vectors having logic state transitions that occur at the first switching frequency;
    providing an operating voltage, the pre-layout netlist, the first switching frequency, and the first set of input vectors as input parameters to the simulation engine;
    simulating the selected type of programmable resource's response to the first set of input vectors using the simulation engine; and
    determining, from the simulated response to the first set of input vectors, a first simulated power consumption at the first switching frequency.

5. The method of claim 4, further comprising:
    selecting a second switching frequency for the selected type of programmable resource;
    generating a second set of input vectors having logic state transitions that occur at the second switching frequency;
    providing an operating voltage, the pre-layout netlist, the second switching frequency, and the second set of input vectors as input parameters to the simulation engine;
    simulating the selected type of programmable resource's response to the second set of input vectors using the simulation engine;
    determining, from the simulated response to the second set of input vectors, a second simulated power consumption at the second switching frequency; and
    averaging the first and second simulated power consumptions.

6. The method of claim 5, wherein an average of the first and second switching frequencies is approximately equal to the determined average switching frequency.

7. The method of claim 4, wherein the first set of input vectors is generated using a software script including a pseudo-random number generator that causes the input vectors to transition logic states transitions at the first switching frequency.

8. The method of claim 2, wherein the simulating comprises:
    selecting a switching frequency for the selected type of programmable resource;
    generating a plurality of sets of input vectors having logic state transitions that occur at the switching frequency;
    for each of the plurality of sets of input vectors:
        providing an operating voltage, the pre-layout netlist, the switching frequency, and the set of input vectors as input parameters to the simulation engine; and
        simulating the selected type of programmable resource's response to the set of input vectors using the simulation engine; and
    determining, from the simulated responses to the plurality of sets of input vectors, a simulated power consumption at the switching frequency.

9. The method of claim 8, further comprising:
    specifying an alternate configuration for the selected type of programmable resource.

10. The method of claim 1, wherein estimating the effective switched capacitance for a selected type of programmable resource comprises:
    ascertaining how many of each of a plurality of types of circuit blocks will be used to form the selected type of programmable resource;

for each type of circuit block,
provided a pre-layout netlist embodying a transistor-level description of the circuit block to a simulation engine;
simulating a power consumption of the type of circuit block using the simulation engine; and
deriving the switched capacitance of the type of circuit block from the simulated power consumption; and
combining the switched capacitances of the various types of circuit blocks in response to the ascertaining.

11. The method of claim 10, further comprising, for each type of circuit block:
estimating a parasitic wire capacitance of the type of circuit block; and
combining the switched capacitance of the type of circuit block with the estimated parasitic wire capacitance of the type of circuit block.

12. The method of claim 11, wherein estimating the parasitic wire capacitance comprises:
estimating the parasitic capacitance of one or more external signal lines coupled to the type of circuit block using a resistive-capacitive (RC) model;
multiplying the switched capacitance of the type of circuit block by a predetermined percentage to estimate the parasitic capacitance of one or more internal signal lines of the type of circuit block; and
combining the parasitic capacitance of the external signal lines with the estimated parasitic capacitance of the internal signal lines.

13. The method of claim 1, wherein determining the average switching frequency comprises:
simulating the user design with a set of realistic input vectors; and
extracting switching activity from the simulation.

14. The method of claim 1, wherein determining the average switching frequency comprises determining a constant switching frequency for each of the types of programmable resources.

15. A method of characterizing a programmable resource to be formed in an integrated circuit (IC) prior to fabrication of the IC, the method comprising:
providing a pre-layout netlist to a simulation engine, the pre-layout netlist embodying a transistor-level description of the programmable resource prior to fabrication of the programmable resource;
simulating a power consumption of the programmable resource using the simulation engine;
deriving a switched capacitance of the programmable resource from the simulated power consumption;
estimating a parasitic wire capacitance of the programmable resource estimating the parasitic capacitance of one or more external signal lines coupled to the programmable resource and multiplying the switched capacitance of the programmable resource by a predetermined percentage to generate an estimated parasitic capacitance of internal signal lines of the programmable resource; and
combining the switched capacitance of the programmable resource with the estimated parasitic wire capacitance to estimate an effective switched capacitance of the programmable resource.

16. The method of claim 15, wherein estimating the parasitic wire capacitance comprises:
estimating the parasitic capacitance of the one or more external signal lines coupled to the programmable resource using a resistive-capacitive (RC) model;
and
combining the estimated parasitic capacitance of the external signal lines with the estimated parasitic capacitance of the internal signal lines.

17. The method of claim 15, wherein the simulating comprises:
selecting a first switching frequency for the programmable resource;
generating a first set of input vectors having logic state transitions that occur at the first switching frequency;
providing an operating voltage, the pre-layout netlist, the first switching frequency, and the first set of input vectors as input parameters to the simulation engine;
simulating the programmable resource's response to the first set of input vectors using the simulation engine; and
determining, from the simulated response to the first set of input vectors, a first simulated power consumption at the first switching frequency.

18. The method of claim 17, further comprising:
selecting a second switching frequency for the programmable resource;
generating a second set of input vectors having logic state transitions that occur at the second switching frequency;
providing an operating voltage, the pre-layout netlist, the second switching frequency, and the second set of input vectors as input parameters to the simulation engine;
simulating the programmable resource's response to the second set of input vectors using the simulation engine;
determining, from the simulated response to the second set of input vectors, a second simulated power consumption at the first switching frequency; and
averaging the first and second simulated power consumptions.

19. The method of claim 17, wherein the first set of input vectors is generated using a software script including a pseudo-random number generator that causes the input vectors to transition logic states transitions at the first switching frequency.

20. The method of claim 15, wherein the simulating comprises:
selecting a switching frequency for the selected type of programmable resource;
generating a plurality of sets of input vectors having logic state transitions that occur at the switching frequency;
for each of the plurality of sets of input vectors:
providing an operating voltage, the pre-layout netlist, the switching frequency, and the set of input vectors as input parameters to the simulation engine; and
simulating the selected type of programmable resource's response to the set of input vectors using the simulation engine; and
determining, from the simulated responses to the plurality of sets of input vectors, a simulated power consumption at the switching frequency.

21. The method of claim 20, further comprising:
specifying an alternate configuration for the selected type of programmable resource.

22. A system for simulating an operation of an integrated circuit (IC) having one or more types of programmable resources, the system comprising:
means for estimating an effective switched capacitance for the one or more types of programmable resources of a yet-to-be fabricated IC, wherein said yet-to-be fabricated IC has not been fabricated, wherein the means for estimating comprises:

means for deriving a switched capacitance of each of the one or more types of programmable resources from a simulated power consumption;

means for estimating a parasitic wire capacitance of each of the one or more types of programmable resources by estimating the parasitic capacitance of one or more external signal lines coupled to the programmable resource and multiplying the switched capacitance of the programmable resource by a pre-determined percentage to generate an estimated parasitic capacitance of internal signal lines of the programmable resource; and means for combining the switched capacitance of the each of the one or more types of programmable resources with the parasitic wire capacitance to estimate the effective switched capacitance of each of the one or more types of programmable resources;

means for identifying a number of each of the one or more types of programmable resources that will be utilized to implement a user design in the yet-to-be fabricated IC;

means for determining an average switching frequency for each of the one or more types of programmable resources;

means for calculating an estimated power consumption of the user design based on the estimated effective switched capacitance, the identified number of each of the one or more types of programmable resources, and the determined average switching frequency; and means for outputting the estimated power consumption for review by a user.

23. The system of claim 22, wherein the means for deriving comprises:

means for providing a pre-layout netlist to a simulation engine, the pre-layout netlist embodying a transistor-level description of each of the one or more types of programmable resources of the yet-to-be fabricated IC;

means for simulating a power consumption of the each of the one or more types of programmable resources using the simulation engine.

24. The system of claim 23, wherein the means for estimating the parasitic wire capacitance comprises:

means for estimating the parasitic capacitance of one or more external signal lines coupled to the programmable resource using a resistive-capacitive (RC) model; and means for combining the parasitic capacitance of the external signal lines with the estimated parasitic capacitance of the internal signal lines.

* * * * *